(12) United States Patent
Kammer

(10) Patent No.: US 6,826,387 B1
(45) Date of Patent: Nov. 30, 2004

(54) EFFICIENT SERVICE REGISTRATION FOR LEGACY APPLICATIONS IN A BLUETOOTH ENVIRONMENT

(75) Inventor: David Kammer, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 577 days.

(21) Appl. No.: 09/728,025

(22) Filed: Nov. 30, 2000

(51) Int. Cl.[7] ................................................ H04B 5/00
(52) U.S. Cl. ........................ 455/41.2; 455/61; 455/557; 455/556.2; 455/517; 455/426.1; 370/338
(58) Field of Search .................... 455/61, 41.2, 517, 455/528, 426.1, 557, 41.3; 340/686.6, 7.6, 3.5, 407.7, 825.19, 7.29; 370/338

(56) References Cited

U.S. PATENT DOCUMENTS

| | | | |
|---|---|---|---|
| 6,040,792 A | 3/2000 | Watson et al. | 341/100 |
| 6,381,467 B1 * | 4/2002 | Hill et al. | 455/519 |
| 6,452,910 B1 * | 9/2002 | Vij et al. | 370/310 |
| 6,470,189 B1 * | 10/2002 | Hill et al. | 455/517 |
| 6,480,505 B1 * | 11/2002 | Johansson et al. | 370/449 |
| 6,493,550 B1 * | 12/2002 | Raith | 455/422.1 |
| 6,526,462 B1 * | 2/2003 | Elabd | 710/242 |
| 6,542,508 B1 * | 4/2003 | Lin | 370/395.43 |
| 6,542,734 B1 * | 4/2003 | Abrol et al. | 455/412.1 |
| 6,571,103 B1 * | 5/2003 | Novakov | 455/464 |
| 6,577,622 B1 * | 6/2003 | Schuster et al. | 370/352 |
| 6,600,734 B1 * | 7/2003 | Gernert et al. | 370/352 |
| 6,600,902 B1 * | 7/2003 | Bell | 455/41.2 |
| 6,611,591 B1 * | 8/2003 | McNiff et al. | 379/268 |
| 6,633,757 B1 * | 10/2003 | Hermann et al. | 370/908 |
| 6,633,761 B1 * | 10/2003 | Singhal et al. | 455/436 |
| 6,658,264 B1 * | 12/2003 | Irvin | 455/552.1 |

FOREIGN PATENT DOCUMENTS

WO     99/48007     9/1999     ........... G06F/13/00

OTHER PUBLICATIONS part k:5 serial Port Profile Specification of the Bluetooth System, Profiles, Version 1.OB vol. 2, Dec. 1, 1999, pp. 165–188, XP002206799 cited in the application p. 174, paragraph 3.1.1. p. 175, paragraph 3.1.3.

Spaker, R.: "Bluetooth Basics" Embedded System Programming, Miller Freeman, San Francisco, CA .US vol. 14, No. 7 Jul. 2000 pp. 57–58, 60,62, 64, 66,68, 70, 72 XP000983337 ISSN: 1040–3272 "Service discovery protocol (SDP)" p. 68, middle column p. 70, right–hand column.

* cited by examiner

Primary Examiner—Marceau Milord
(74) Attorney, Agent, or Firm—Wagner, Murabito & Hao LLP

(57) ABSTRACT

A method and device for providing a service record for an application (e.g., a legacy application) running on a virtual serial port of a wireless transceiver device, such as a Bluetooth-enabled device. The virtual serial port emulates a serial connection (e.g., a serial cable) for the application. The virtual serial port for the application is opened by a virtual serial port driver. In accordance with the present embodiment of the present invention, the virtual serial port driver also provides the service name of the application. The virtual serial port driver can derive the service name from the name of the application, or the virtual serial port driver can use a default name. Thus, the virtual serial port driver performs the additional function of automatically providing a service name for a application, thereby introducing a standard, efficient and user-friendly approach for providing a readily-identifiable service name for a legacy application.

8 Claims, 10 Drawing Sheets

| ITEM | DEFINITION | VALUE |
|---|---|---|
| ServiceClassIDList | | Note 1 |
| ServiceClass0 | Serial Port | Note 1 |
| ProtocolDescriptorList | | |
| Protocol0 | L2CAP | Note 1 |
| Protocol1 | RFCOMM | Note 1 |
| ProtocolSpecificParameter0 | Server Channel | N = Server Channel Number |
| ServiceName | Displayable Text Name | ? |

Note 1: Defined by Bluetooth Specification

FIGURE 1B
(Prior Art)

EFFICIENT SERVICE REGISTRATION FOR LEGACY APPLICATIONS IN A BLUETOOTH ENVIRONMENT

TECHNICAL FIELD

The present invention relates to the field of networks of devices connected using wireless links, in particular those devices that use the Bluetooth technology. Specifically, the present invention pertains to a method and system for registering a service record for a legacy application running on a virtual serial port.

BACKGROUND ART

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the Bluetooth technology. Bluetooth is the code name for a technology specification for short-range radio links that will allow the many proprietary cables that connect devices to one another to be replaced with short-range radio links.

The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone. Printers, personal digital assistants (palmtop computer systems, hand-held devices and the like), desktop computer systems, fax machines, keyboards, joysticks and virtually any other digital device can be part of a Bluetooth system. Bluetooth radio technology can also provide a universal bridge to existing data networks and a mechanism to form small private ad hoc groupings ("scatternets" or "piconets") of connected devices away from fixed network infrastructures.

One issue that arises with the introduction of Bluetooth technology is the treatment of "legacy applications;" that is, those applications developed before the advent of Bluetooth and still residing on a Bluetooth-enabled device. These legacy applications are predicated on the use of actual (physical) serial cables, such as RS232 or similar serial cables, to connect the server and client devices. However, as described above, the Bluetooth technology replaces such cables with wireless connections. To address the issue of legacy applications, the Bluetooth specification ("Specification of the Bluetooth System, Core," version 1.0B, dated Dec. 1, 1999, herein incorporated by reference as background) defines protocols and procedures that can be used by Bluetooth devices to emulate serial cables.

Prior Art FIG. 1A is a block diagram illustrating the protocol layers and applications residing on Bluetooth-enabled devices A 10 and B 20 in one embodiment. For Bluetooth-enabled devices, the protocol layers are described by the Bluetooth specification referenced above. In general, baseband 19 and 29 carry out baseband protocols and other low-level link routines, and logical Link Control and Adaptation Protocol (L2CAP) 18 and 28 support higher level protocol functions.

Because they pre-date Bluetooth, legacy applications 12 and 22 are not configured to implement Bluetooth procedures for setting up emulated serial cables. Accordingly, RFCOMM 16 and 26 provide a transport protocol for emulation of serial ports over L2CAP 18 and 28, respectively. Serial port emulation blocks 14 and 24 are the entities that emulate serial ports and/or provide an application program interface to legacy applications 12 and 22, respectively. Thus, legacy applications 12 and 22 can run on devices A 10 and B 20, respectively, and communicate using the "virtual" serial ports as if there were a real serial cable connecting the devices.

It is expected that the number of Bluetooth devices will increase significantly, and that the number of services (e.g., applications) that can be provided over Bluetooth links will also increase significantly. To help users of Bluetooth devices sort through the increasing number of services and applications that will become available, procedures are being developed to standardize how services are to be located and identified on Bluetooth devices. These standards and procedures are described in the above-referenced Bluetooth specification and summarized below.

The protocol stack used by Bluetooth devices includes a Service Discovery Protocol (SDP) that is used to locate (discover) services and applications that are available on a Bluetooth-enabled device, or that are in the vicinity of such a device. SDP provides direct support for search inquiries by service class and/or service attributes, and also supports service browsing. Search inquiries by service class are for identifying whether a known service is available, and search inquiries by service attributes are used for identifying whether services having particular characteristics are available. Service browsing is used for general searches to identify, for example, what services of a particular type (e.g., news, reference, gaming, etc.) are available.

Service discovery can be initiated by either a master device or a slave device. Generally, in the context of service discovery and service use, the terms "server" and "client" are used. "Server" is used to refer to a device with services and applications waiting for a connection from a client device, and "client" refers to a device that initiates (requests) a connection to the application or service. A server device is also sometimes called an "acceptor," and a client device is also sometimes called an "initiator."

The Bluetooth service discovery process provides the means for client applications to discover the existence of services provided by server applications, as well as the attributes of those services. The attributes of a service are maintained by the server in a service record. The attributes of a service include the type or class of service offered, and the protocol information needed to utilize the service. Significantly, the attributes of a service should also include a service name, which is a text string containing a user-friendly (e.g., human-readable) name for the service.

An issue with regard to legacy applications (e.g., 12 and 22 of FIG. 1A) is that they are not able to participate in the Bluetooth service discovery process. As mentioned, legacy applications 12 and 22 pre-date Bluetooth, and thus are not configured for the Bluetooth service discovery process.

Regarding service records for legacy applications, the Bluetooth. specification (specifically, Section 3.1.3 of the Serial Port Profile) states: "All services/applications reachable through RFCOMM [that is, legacy applications] need to provide an SDP service record that includes the parameters necessary to reach the corresponding service/application . . . In order to support legacy applications running on serial ports, the service registration must be done by some helper-application, which is aiding the user in setting up the port" (emphasis added).

Prior Art FIG. 1B is a table exemplifying a service record 50 for an available service or application, in particular for a legacy application. "ServiceClassIDList" identifies the type of service (e.g., serial port) represented by the service record 50. The "ProtocolDescriptorList" specifies the protocol stacks (e.g., L2CAP and RFCOMM) that may used for the service. The "ProtocolSpecificParameter0" represents the RFCOMM server channel of the legacy application. The "ServiceName" is a text name displayable to and readable by a user.

The Bluetooth specification defines most of the values in service record 50 for a legacy application, with the notable exception of the service name (ServiceName). Other than the reference to "some helper application," the Bluetooth specification provides no guidance regarding how the service name for the legacy application is to be provided for service record 50.

The service name represents an important piece of information, enabling a user to readily identify an application and distinguish it from other applications, in particular when browsing through the large number of services and applications expected to be available in a Bluetooth environment. Thus, it is desirable to have a standard approach for providing the service name for a legacy application, so that the legacy application is readily identifiable to the user, as well as to simplify the service discovery process for the user.

One solution is to display to the user a pop-up window (or other graphical user interface), allowing the user to enter information to complete service record 50 for each legacy application. However, this solution can be problematic if the user does not know or understand what information is needed for service record 50. This solution may also be time-consuming and inefficient when information for a large number of legacy applications needs to be entered.

DISCLOSURE OF THE INVENTION

Accordingly, what is needed is a system and/or method for providing service record information (in particular, the service name) for legacy applications resident on Bluetooth-enabled devices. What is also needed is a system and/or method that satisfies the above need and that is user-friendly and conveniently implemented. In addition, what is needed is a system and/or method that can satisfy the above needs and that is satisfactorily consistent with the Bluetooth specification. The present invention provides these advantages and others not specifically mentioned above but described in the sections to follow.

A method and device are described for providing a service record for an application (e.g., a legacy application) running on a virtual serial port of a device. The virtual serial port emulates a serial connection (e.g., a serial cable) for the legacy application. The virtual serial port for the legacy application is opened by a virtual serial port driver. In accordance with the present embodiment of the present invention, the virtual serial port driver also provides the service name of the legacy application.

In one embodiment, the virtual serial port driver derives the service name from the name of the legacy application. In another embodiment, the virtual serial port driver uses a default name associated with the legacy application.

In a preferred embodiment, the device is a Bluetooth-enabled device. In the Bluetooth embodiment, a RFCOMM channel is selected for the virtual serial port. In one embodiment, the RFCOMM channel number is included in the service name derived by the virtual serial port driver.

In another embodiment, the present invention pertains to a method for accessing a legacy application residing on one wireless transceiver device from another wireless transceiver device in a network of wireless devices (e.g., Bluetooth devices in a Bluetooth network). A wireless connection between the first wireless transceiver device and the second wireless transceiver device is established. A first virtual serial port on the first wireless transceiver device and a second virtual serial port on the second wireless transceiver device are opened by a first virtual serial port driver and a second virtual serial port driver, respectively. The first wireless transceiver device creates a service record corresponding to the legacy application. A service name for the legacy application is registered in the service record. In accordance with the present invention, the service name is provided by the first virtual serial port driver. The service record is used by the second wireless transceiver device to locate the legacy application, so that a communication path from the second wireless transceiver device to the legacy application can be established over the first and second virtual serial ports. For example, the service name can be displayed to the user who is using the second wireless transceiver device to browse through the services provided by the first wireless transceiver device in accordance with the Bluetooth Service Discovery Protocol.

Thus, in accordance with an embodiment of the present invention, the virtual serial port driver performs the additional function of automatically providing a service name for a legacy application. The present invention introduces a standard and efficient approach for providing the service name for a legacy application, so that the legacy application is readily identifiable to the user. In addition, the service discovery process for legacy applications is simplified for the user. Furthermore, the present invention is consistent with the Bluetooth specification.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

PRIOR ART

PRIOR ART FIG. 1B illustrates an exemplary service record for a legacy application.

BEST MODE FOR CARRYING OUT THE INVENTION

Figure 1A:
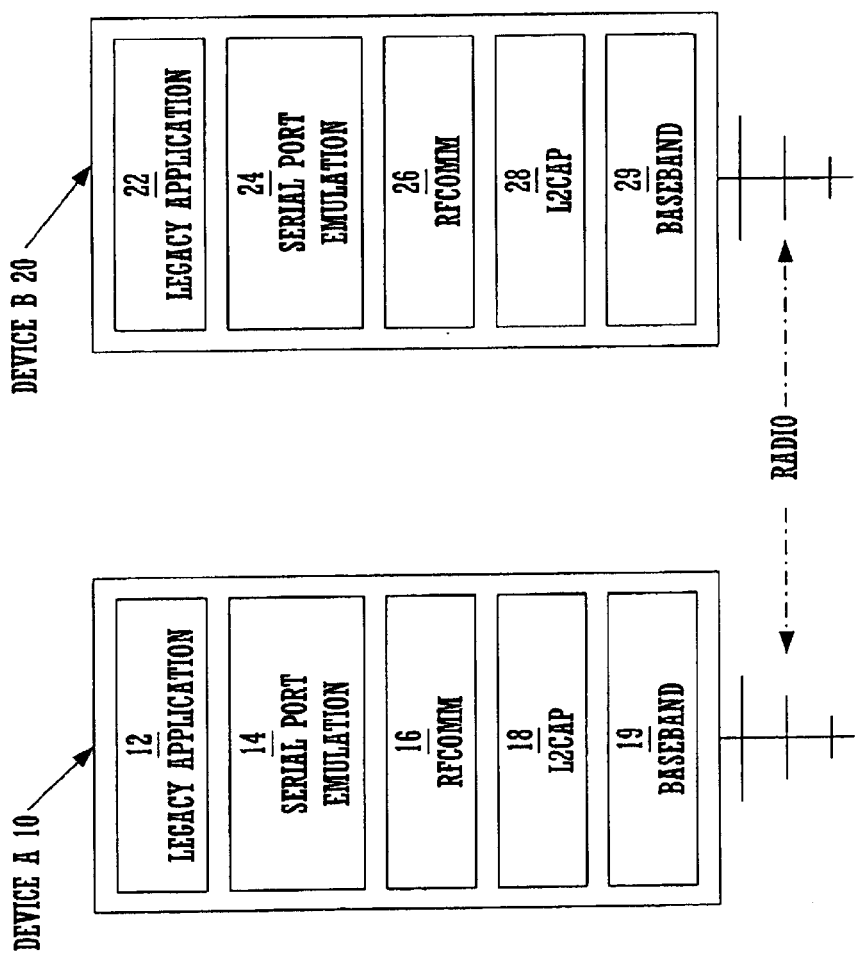
FIG. 1A is a block diagram illustrating the protocol layers and applications residing on one embodiment of wireless transceiver devices.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "opening," "creating," "entering," "selecting," "including," "deriving," "using," "establishing," or the like, refer to the action and processes (e.g., processes 800 and 900 of FIGS. 8 and 9, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth technology allows cables that connect devices to one another to be replaced with short-range radio links. However, it is appreciated that the present invention may be utilized with devices and systems coupled using technologies and/or protocols different from Bluetooth, including but not limited to infrared communications links as defined by the Infrared Data Association (IrDA).

In the. parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Figure 2:
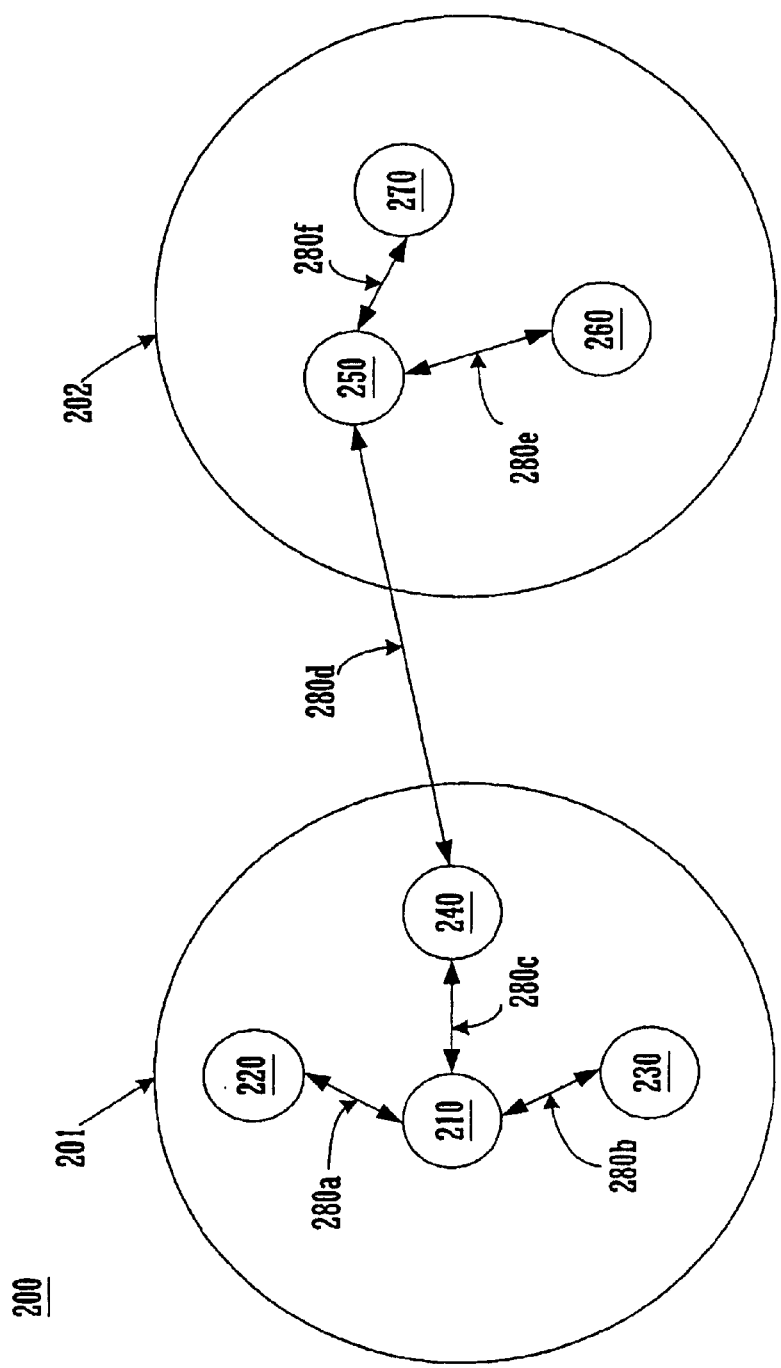
FIG. 2 illustrates one embodiment of a network of devices coupled using wireless connections in accordance with the present invention.

FIG. 2 illustrates the topology of a network 200 of devices coupled using wireless connections in accordance with one embodiment of the present invention. Devices 210, 220, 230 and 240 are coupled in piconet 201 using wireless connections 280a–c. Similarly, devices 250, 260 and 270 are coupled in piconet 202 using wireless connections 280e–f. Piconet 201 and piconet 202 are coupled using wireless connection 280d. Devices 210–270 can be printers, personal digital assistants (PDAs), desktop computer systems, laptop computer systems, cell phones, fax machines, keyboards, joysticks and virtually any other device. In the present embodiment, devices 210–270 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 3:
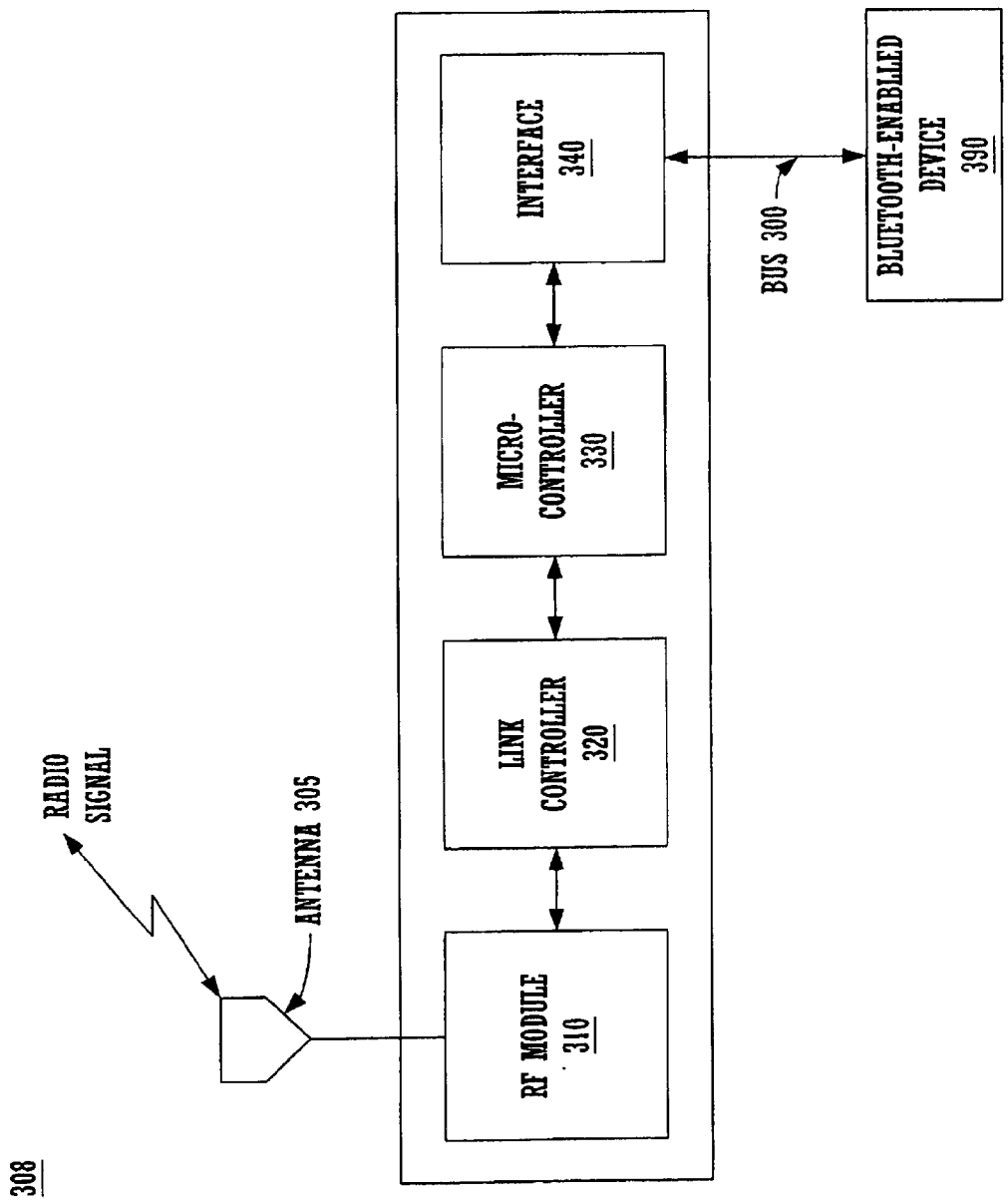
FIG. 3 is a block diagram showing one embodiment of a Bluetooth wireless transceiver in accordance with the present invention.

FIG. 3 is a block diagram of one embodiment of a transceiver 308 in accordance with the present invention. In a preferred embodiment (the "Bluetooth embodiment"), transceiver 308 is a Bluetooth device comprising a digital component (e.g., a Bluetooth controller) and an analog component (e.g., a Bluetooth radio).

In the present embodiment, transceiver 308 comprises an antenna 305 for receiving or transmitting radio signals, a radio frequency (RF) module 310, a link controller 320, a microcontroller (or central processing unit) 330, and an external interface 340. In the present embodiment, transceiver 308 is coupled by a system bus 300 to a Bluetooth-enabled device 390 (e.g., a host device such as a computer system or similar intelligent electronic device, a PDA, a printer, a fax machine, etc.). However, it is appreciated that in another embodiment, transceiver 308 may be integrated into Bluetooth-enabled device 390.

In the Bluetooth embodiment, RF module 310 is a Bluetooth radio. The Bluetooth radio can provide: a bridge to existing data networks, a peripheral interface, and a mechanism to form piconets of connected devices away from fixed network infrastructures (see FIG. 2).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In one embodiment, link controller 320 is a hardware digital signal processor for performing baseband processing as well as other functions such as Quality-of-Service, asynchronous transfers, synchronous transfers, audio coding, and encryption (refer also to FIG. 6, below). Link controller 320 has two major states: standby and connection. In addition, there are seven substates: page, page scan, inquiry, inquiry scan, master response, slave response, and inquiry response. The substates are interim states that are used to add new slaves to a piconet (FIG. 2).

Continuing with reference to FIG. 3, in one embodiment, microcontroller 330 is an application specific integrated circuit (ASIC). In the Bluetooth embodiment, microcontroller 330 is a separate central processing unit (CPU) core for managing transceiver 308 and for handling some inquiries and requests without having to involve the host device. In the Bluetooth embodiment, microcontroller 330 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup.

In one embodiment, interface 340 is for coupling transceiver 308 to Bluetooth-enabled device 390 in a suitable format. Transceiver 308 may be coupled by system bus 300 to Bluetooth-enabled device 390 (e.g., a host device such as a computer system or similar intelligent electronic device, a PDA, a printer, a fax machine, etc.), or transceiver 308 may be integrated into Bluetooth-enabled device 390. In one embodiment, interface 340 runs software that allows transceiver 308 to interface with the operating system of Bluetooth-enabled device 390. In accordance with the present invention, interface 340 may be any of a variety of physical bus interfaces, including but not limited to a Universal Serial Bus (USB) interface, a Personal Computer (PC) Card interface, a CardBus or Peripheral Component Interconnect (PCI) interface, a mini-PCI interface, a Personal Computer Memory Card International Association (PCMCIA) interface, an Industry Standard Architecture (ISA) interface, or a RS232 interface.

Figure 4:
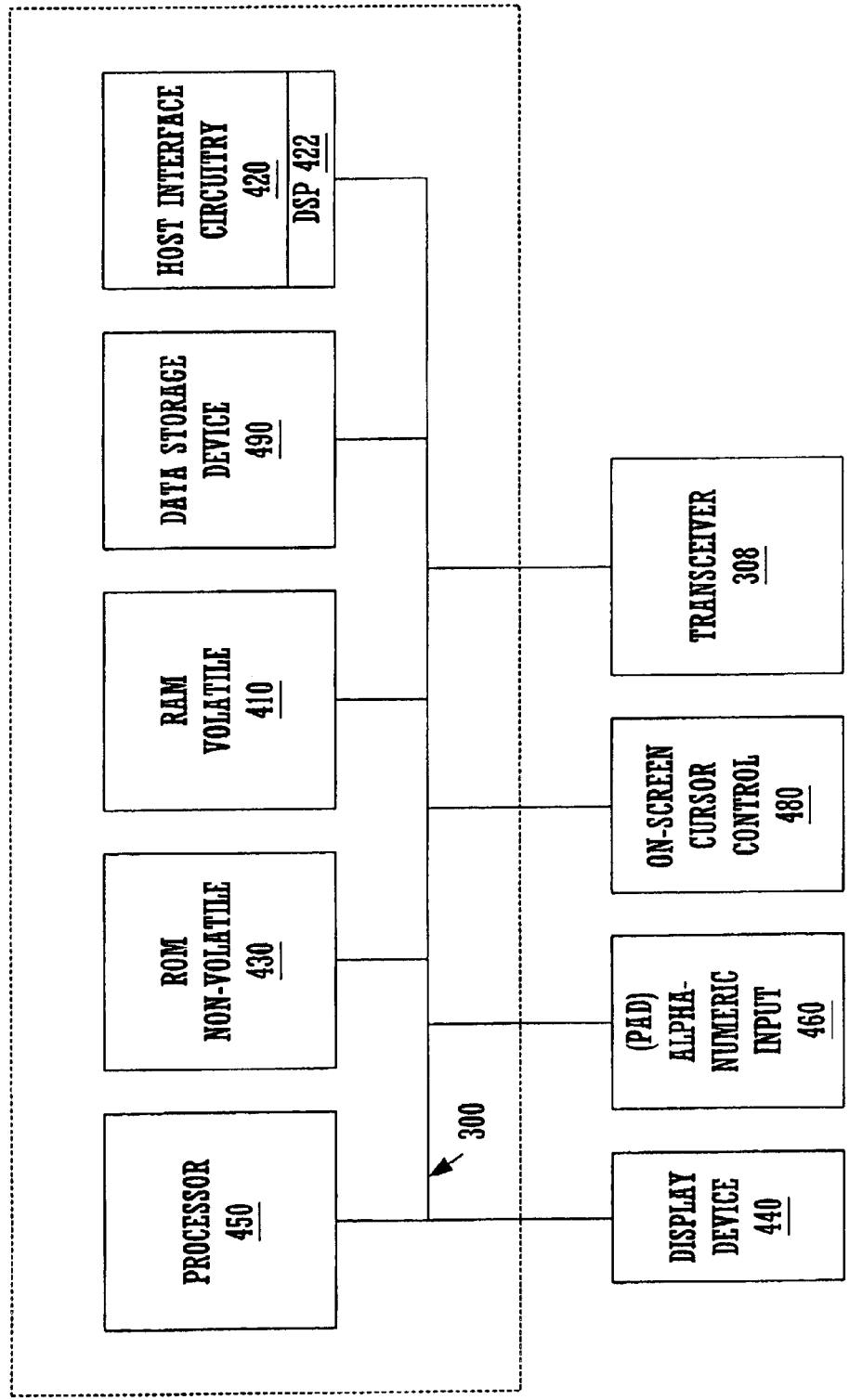
FIG. 4 is a block diagram of an exemplary portable computer system coupled to the Bluetooth wireless transceiver of FIG. 3 in accordance with one embodiment of the present invention.

FIG. 4 is a block diagram of one embodiment of device 400 for hosting a transceiver 308 in accordance with the present invention. In the present embodiment, device 400 is any type of intelligent electronic device (e.g., a desktop or laptop computer system, a portable computer system or personal digital assistant, a cell phone, a printer, a fax machine, etc.). In the Bluetooth embodiment, device 400 is a Bluetooth-enabled device (e.g., device 390 of FIG. 3) coupled with a Bluetooth transceiver 308.

Continuing with reference to FIG. 4, device 400 includes an address/data bus 300 for communicating information, a central processor 450 coupled with the bus 300 for processing information and instructions, a volatile memory 410 (e.g., random access memory, RAM) coupled with the bus 300 for storing information and instructions for the central processor 450, and a non-volatile memory 430 (e.g., read only memory, ROM) coupled with the bus 300 for storing static information and instructions for the processor 450. Device 400 also includes an optional data storage device 490 (e.g., a memory stick) coupled with the bus 300 for storing information and instructions. Data storage device 490 can be removable. Device 400 also optionally contains a display device 440 coupled to the bus 300 for displaying information to the user.

Device 400 also includes a signal transmitter/receiver device 308, which is coupled to bus 300 for providing a wireless radio (RF) communication link between device 400 and other wireless devices. In the Bluetooth embodiment, transceiver 308 is compliant with the Bluetooth specification ("Specification of the Bluetooth System, Core," version 1.0B, dated Dec. 1, 1999, herein incorporated by reference in its entirety); see FIG. 3.

In one embodiment, device 400 of FIG. 4 includes host interface circuitry 420 coupled to bus 300. Host interface circuitry 420 includes an optional digital signal processor (DSP) 422 for processing data to be transmitted or data that are received via transceiver 308. Alternatively, processor 450 can perform some or all of the functions performed by DSP 422.

Also included in device 400 is an optional alphanumeric input device 460 that, in one implementation, is a handwriting recognition pad ("digitizer"). Alphanumeric input device 460 can communicate information and command selections to processor 450 via bus 300. In one implementation, alphanumeric input device 460 is a touch screen device. Alphanumeric input device 460 is capable of registering a position where a stylus element (not shown) makes contact.

Device 400 also includes an optional cursor control or directing device (on-screen cursor control 480) coupled to bus 300 for communicating user input information and command selections to processor 450. In one implementation, on-screen cursor control device 480 is a touch screen device incorporated with display device 440. On-screen cursor control device 480 is capable of registering a position on display device 440 where a stylus element makes contact. The display device 440 utilized with device 400 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 440 is a flat panel display.

Figure 5:
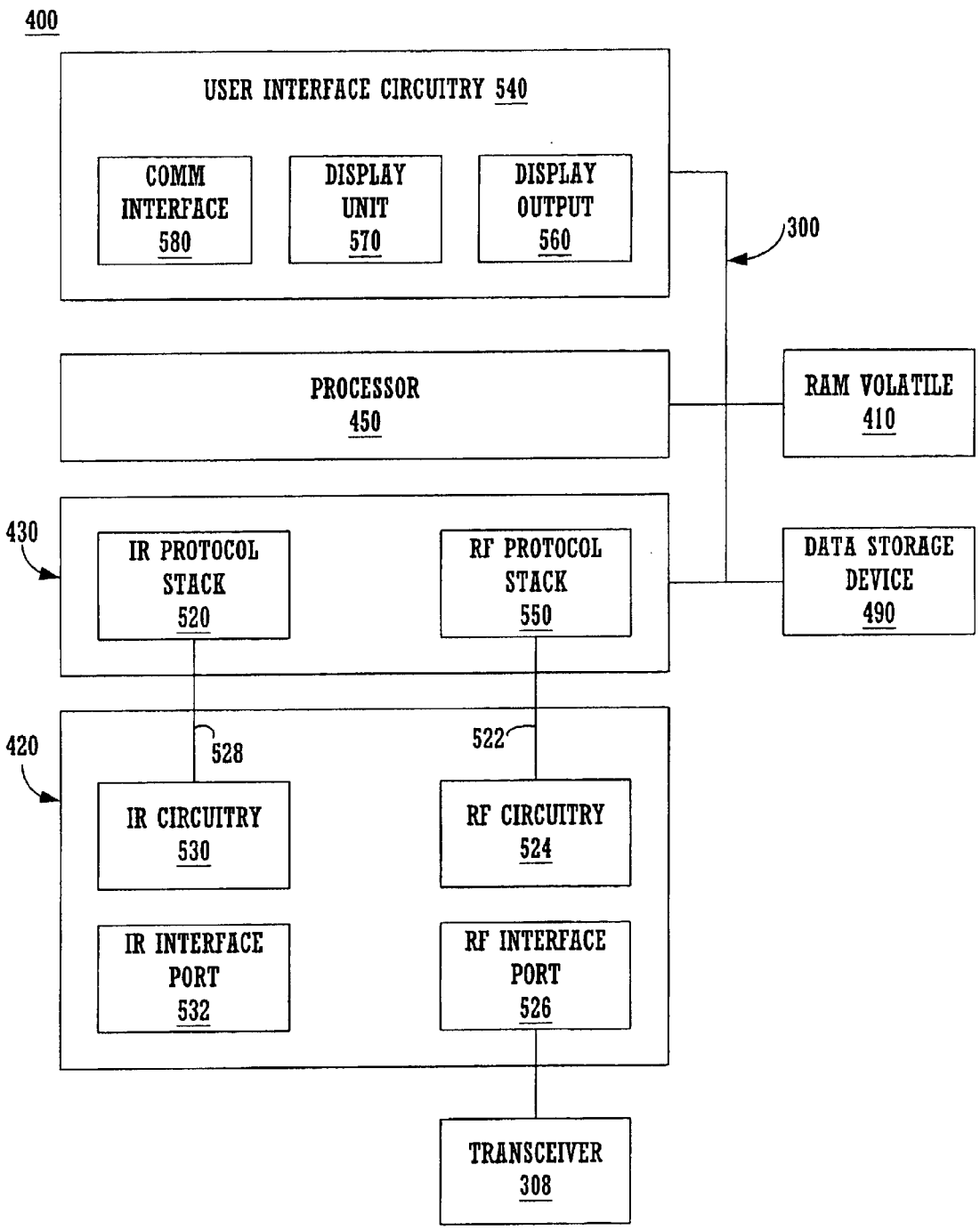
FIG. 5 is a block diagram showing features of the portable computer system of FIG. 4 in accordance with one embodiment of the present invention.

FIG. 5 is a block diagram showing additional features of device 400 in accordance with one embodiment of the present invention. User interface circuitry 540 is coupled to processor 450 via bus 300. User interface circuitry includes hardware and software components that provide user input and output resources for functions performed by processor 450. In the present embodiment, user interface circuitry 540 includes a display output 560, a display input 570, and communication interface 580.

In this embodiment, display output 560 receives digital information representing graphical information from processor 450, and converts the information to a graphical display, such as text and/or images, for display on display device 440 (FIG. 4), for example. Display input 570 may receive data inputs, such as graphical data inputs, from a user. The graphical data inputs can be entered by the user with a stylus element on the pressure-sensitive display device 440 (specifically, on-screen cursor control device 480, FIG. 4) or the alphanumeric input device 460 (FIG. 4).

The communication interface 580 allows the user to enter other types of data, such as audio or video data, or data formatted for operation with particular applications executed by device 400, such as calendar data, electronic mail data, word processing, databases, and the like. In one embodiment of the present invention, the communication interface 580 is a serial communication port, but could also alternatively be of any of a number of well-known communication standards and protocols, e.g., parallel, SCSI (small computer system interface), Firewire (IEEE 1394), Ethernet, etc.

Host interface circuitry 420 is coupled to processor 450 via bus 300. Host interface circuitry 420 (or link interface circuitry or data interface circuitry) illustrates, but is not limited to, two alternative link interface ports for establishing a wireless link to another device: an RF interface port 526 and an infrared (IR) interface port 532.

In the present embodiment, RF circuitry 524 converts signals to radio frequency output and accepts radio frequency input via RF interface port 526. In the Bluetooth embodiment, RF interface port 526 is a Bluetooth transceiver 308 (FIG. 3). RF signals received by RF circuitry 524 are converted to electrical signals and relayed to RF protocol stack 550 via connection 522.

In the present embodiment, IR circuitry 530 converts signals into infrared output and accepts infrared input via IR interface port 532. Infrared communication signals received by IR circuitry 530 are converted to electrical signals that are relayed to IR protocol stack 520 via connection 528.

Processor 450 is capable of executing RF protocol stack 550 and IR protocol stack 520. IR stack 520 implements an IR protocol to support infrared links with other devices.

Figure 6:
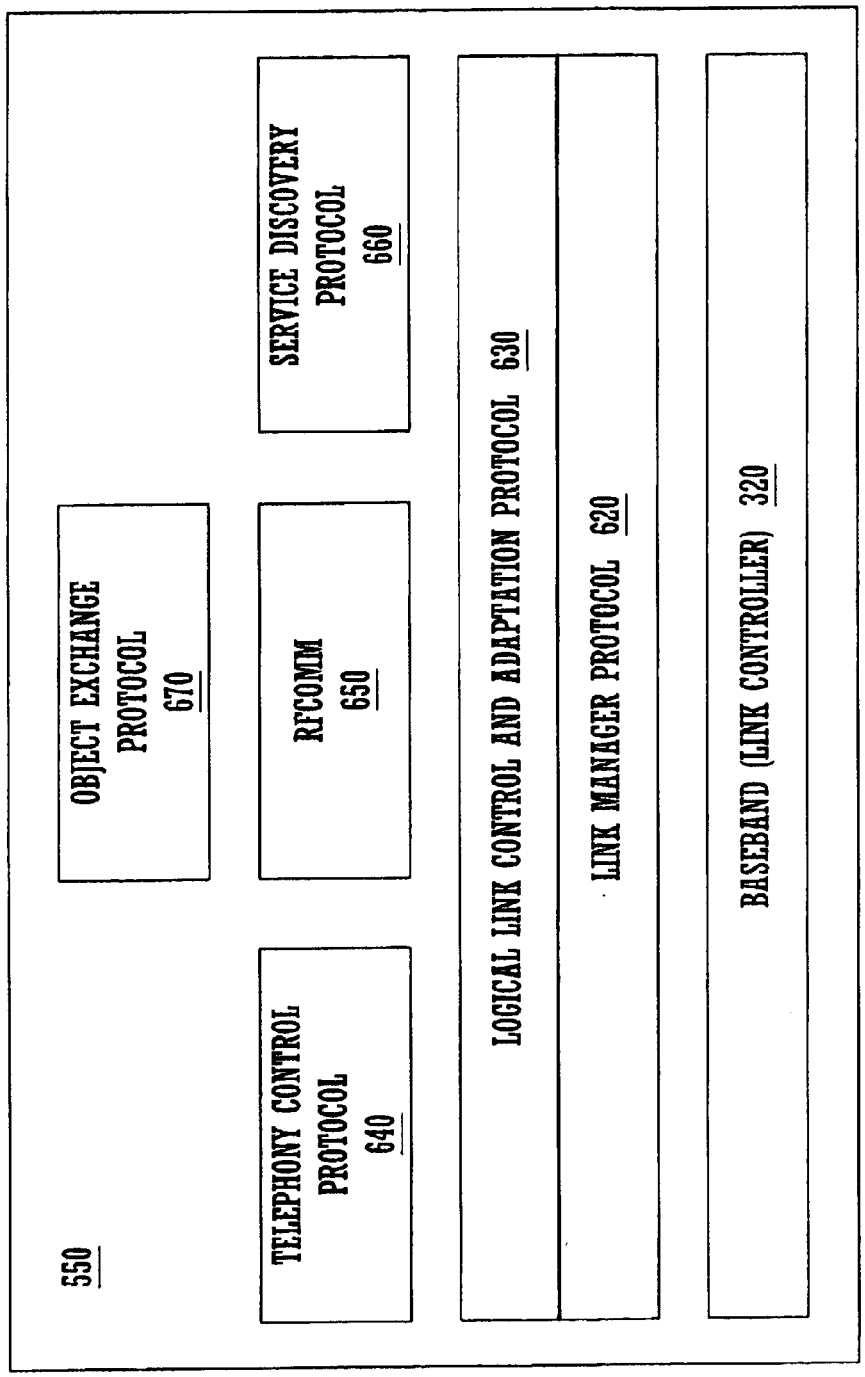
FIG. 6 is a block diagram illustrating a protocol stack used by a Bluetooth-enabled device in accordance with one embodiment of the present invention.

FIG. 6 is a block diagram illustrating the layers of the RF protocol stack 550 used by a Bluetooth-enabled device such as device 400 of FIG. 4 in accordance with one embodiment (the Bluetooth embodiment) of the present invention. The layers of RF protocol stack 550 include baseband (link controller) layer 320, Link Manager Protocol (LMP) layer 620, Logical Link Control and Adaptation Protocol (L2CAP) layer 630, Telephony Control Protocol (TCS) layer 640, RFCOMM layer 650, Service Discovery Protocol (SDP) layer 660, and Object Exchange Protocol (OBEX) layer 670.

Continuing with reference to FIG. 6, in the present embodiment, baseband layer 320 carries out baseband protocols and other low-level link routines. LMP layer 620 is used for link set-up, security and control. L2CAP layer 630 supports higher level protocol multiplexing, packet segmentation and reassembly, and the conveying of quality-of-service information. TCS layer 640 defines the call control signaling for the establishment of speech and data calls between Bluetooth devices. RFCOMM layer 650 provides emulation of serial ports over the L2CAP protocol 630. SDP layer 660 provides a means for applications to discover which services are available, and the characteristics of the services. OBEX layer 670 enables the exchange of data objects. Additional information is provided by the "Specification of the Bluetooth System, Core," version 1.0B, dated Dec. 1, 1999.

Figure 7:
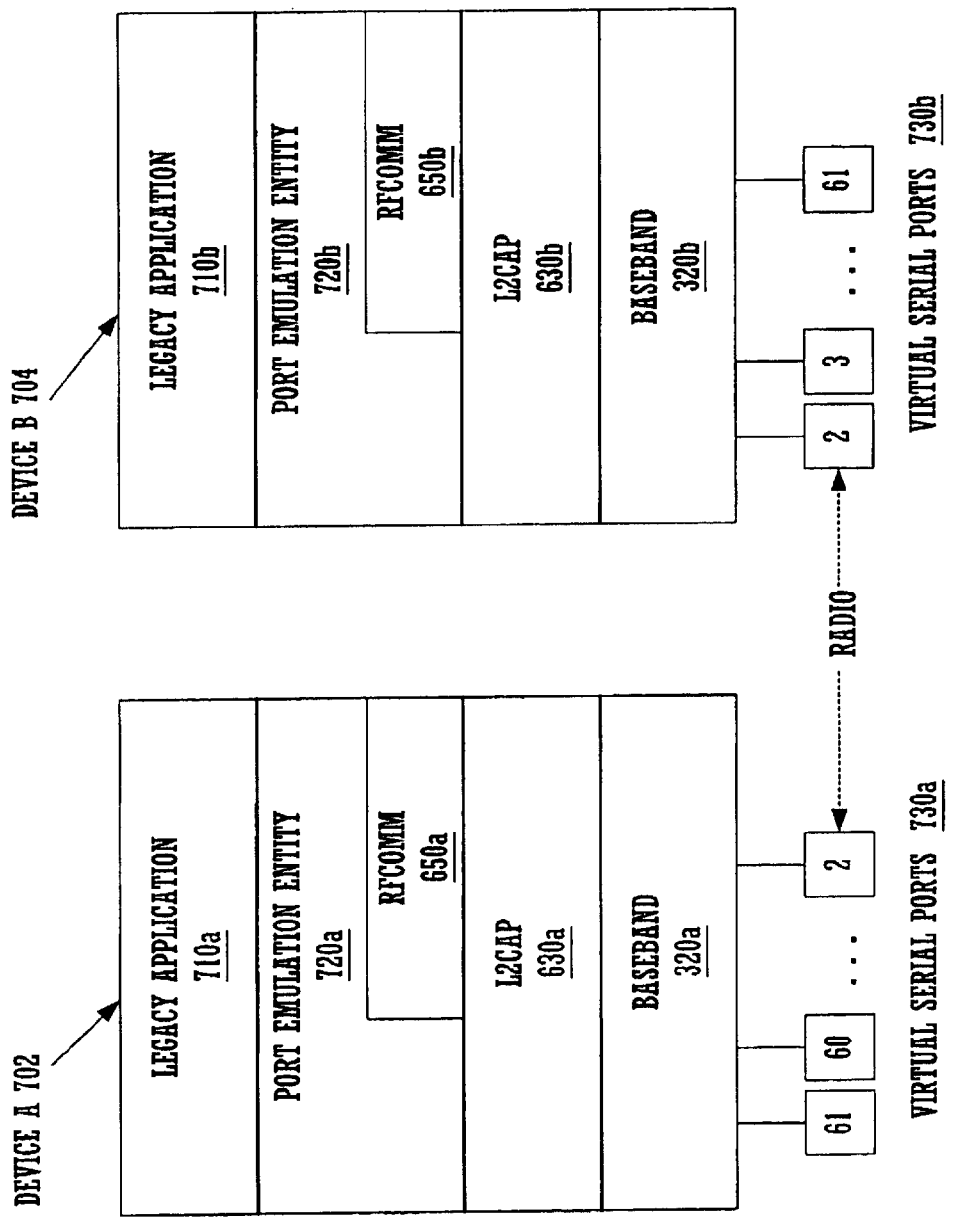
FIG. 7 is a block diagram illustrating the protocol layers and applications residing on wireless transceiver devices in accordance with one embodiment of the present invention.

FIG. 7 is a block diagram illustrating the protocol layers and applications residing on wireless transceiver devices A 702 and B 704 in accordance with one embodiment of the present invention. In the Bluetooth embodiment, devices A 702 and B 704 are Bluetooth-enabled devices (e.g., device 400 of FIG. 4). For the purposes of the discussion herein, device A 702 is treated as a server or acceptor device, and device B 704 is treated as a client or initiator device.

Residing on devices A 702 and B 704 of FIG. 7 are legacy applications 710a and 710b, respectively. Legacy applications 710a and 710b are applications (services) configured to communicate with each other. The legacy application 710a on device A 702 and the legacy application 710b residing on device B 704 may be the same application, or they may be different but complementary applications. For example, legacy applications 710a and 710b may be gaming programs that interact with each while running on devices A 702 and B 704. In another example, legacy applications 710a and 710b may be pieces of a synchronization program that is used for sharing information between devices A 702 and B 704; in this case, the applications may have different configurations in relation to their separate but complementary functional roles.

It is appreciated that, although a legacy application is shown on both of devices A 702 and B 704, a non-legacy application can reside on one of the devices and communicate with a compatible legacy application on the other device. It is further appreciated that "application" and "service" can include other than end-user applications and services; that is, they can also include higher level protocols or other applications and services acting on behalf of end-user applications and services. Accordingly, the application/service can be running in the background.

Similarly, port emulation entities 720a and 720b, RFCOMM 650a and 650b, L2CAP 630a and 630b, and baseband 320a and 320b reside on devices A 702 and B 704, respectively, and these protocol layers may be the same on each device or there may be implementation-specific differences. It is appreciated that other protocol layers can also be present in devices A 702 and B 704, as shown by FIG. 6.

With reference to FIG. 7, devices A 702 and B 704 (using RFCOMM to communicate) may open multiple emulated ("virtual") serial ports 730a and 730b. RFCOMM supports up to 60 virtual serial ports, although the number of ports used by a device is implementation-specific. A RFCOMM channel number (specifically, a subfield of a Data Link Connection Identifier) identifies an ongoing connection between devices A 702 and B 704. In the present embodiment, the RFCOMM channel number is represented by six bits, with a usable value range of 2 through 61. If the client device (e.g., device B 704), or an application associated with the client device, decides to use a service (e.g., legacy application 710a), it must open a separate connection to the service provider (that is, a server such as device A 702) in order to utilize the service.

Virtual serial ports 730a and 730b are opened using a virtual serial port driver residing on each of the devices A 702 and B 704. In the present embodiment, the virtual serial port driver for device A 702 comprises port emulation entity 720a and RFCOMM 650a, and the virtual serial port driver for device B 702 comprises port emulation entity 720b and RFCOMM 650b. RFCOMM 650a and 650b provide a transport protocol for emulation of serial ports over L2CAP 630a and 630b, respectively. Port emulation entities 720a and 720b emulate serial ports and/or provide an application program interface to legacy applications 710a and 710b, respectively. Thus, legacy applications 710a and 710b can run on devices A 702 and B 704, respectively, and communicate using the virtual serial ports 730a and 730b as if there were a real serial cable connecting the devices.

Each device A 702 and B 704 maintains a service record, including the service name, for the services and applications available on the device. In accordance with one embodiment of the present invention, the virtual serial port drivers for devices A 702 and B 704 have the additional function of providing the service name for legacy applications 710a and 710b, respectively. On the server device (e.g., device A 702), a service name for legacy application 710a is provided by the virtual serial port driver for device A 702, and that service name is entered into the service record for legacy application 710a. Similarly, on the client device (e.g., device B 704), a service name for legacy application 710b is provided by the virtual serial port driver for device B 704, and that service name is entered into the service record for legacy application 710b. Additional information with regard to service records is provided in the "Specification of the Bluetooth System, Core," version 1.0B, dated Dec. 1, 1999.

Figure 8:
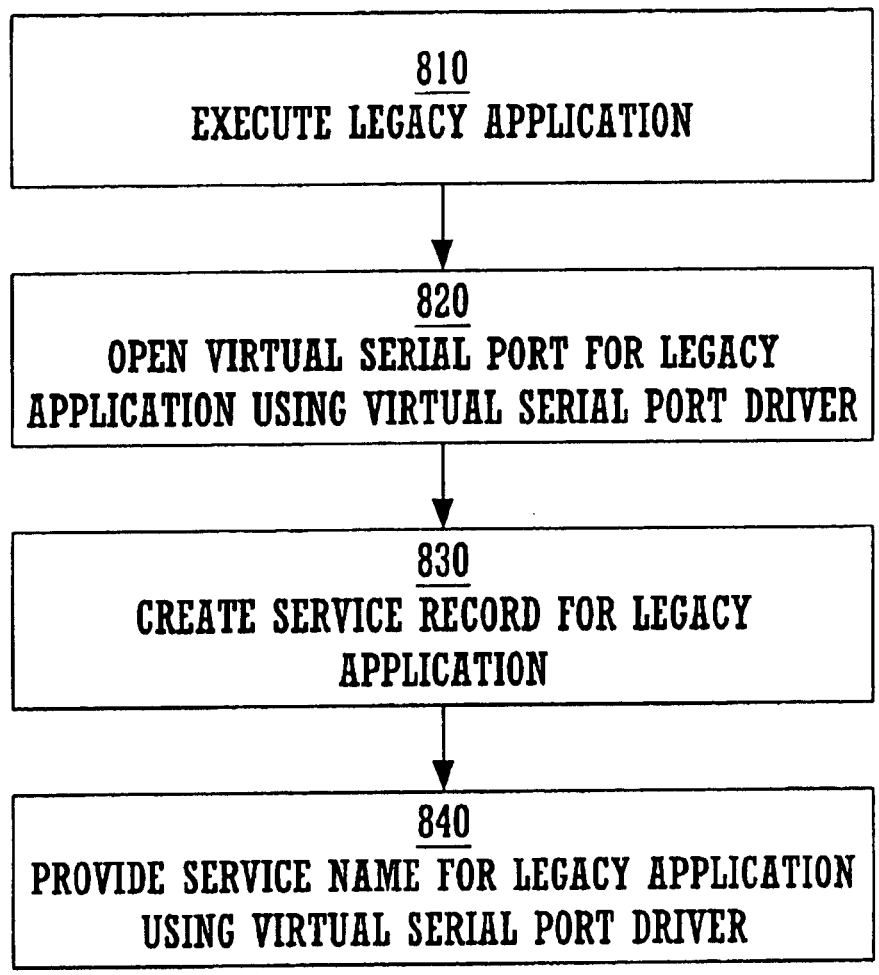
FIG. 8 is a flowchart of the steps in a process for providing a service name for a legacy application in accordance with one embodiment of the present invention.

FIG. 8 is a flowchart of the steps in a computer-implemented process 800 for providing a service record (specifically, for completing the service record by providing a service name) for an application running on a virtual serial port (that is, a legacy application). In the present embodiment, process 800 is implemented by a server device such as device A 702 (FIG. 7), although process 800 can be similarly implemented on a client device such as device B 704 (FIG. 7). In the present embodiment, process 800 is implemented as computer-readable program instructions stored in a memory unit (e.g., ROM non-volatile 430 of FIG. 4) and executed by a processor (e.g., processor 450 or DSP 422 of FIG. 4).

In step 810 of FIG. 8, with reference also to FIG. 7, legacy application 710a is executed on device A 702. That is, legacy application 710a is open and running on device A 702.

In step 820 of FIG. 8, with reference as well to FIG. 7, a virtual serial port (e.g., one of the virtual serial ports 730a) is opened for legacy application 710a. In the present embodiment, the virtual serial port is opened by a virtual serial port driver residing on device A 702. Additional information with regard to the emulation of serial ports for legacy applications is provided by the "Specification of the Bluetooth System, Core," version 1.0B, dated Dec. 1, 1999.

In step 830 of FIG. 8, and with reference to FIG. 7, a service record is created for legacy application 710a. In one embodiment, the service record is created when the virtual serial port 730a is opened for legacy application 710a. In another embodiment, the service record is created when legacy application 710a is executed (step 810).

In step 840 of FIG. 8, with reference also to FIG. 7, in the present embodiment of the present invention, the virtual serial port driver for device A 702 provides a service name that is registered in the service record for legacy application 710a. In one embodiment, the service name is derived by the virtual serial port driver from the name of the legacy application 710a. In another embodiment, the service name is a default name. In these and other embodiments, the service name provided by the virtual serial port driver is a name that a user recognizes as corresponding to legacy application 710a.

In the case where the default name is used for the service name, an instance can arise in which more than one legacy application is running at a time. In this instance, it is necessary to differentiate the default names provided for each of the legacy applications. In one embodiment, the RFCOMM server channel corresponding to the virtual serial port for each of the legacy applications currently running is included in the service name. That is, one legacy application is associated with a first RFCOMM channel, and another legacy application is associated with a second RFCOMM channel. The first RFCOMM channel number is included in the service name of one legacy application, and the second RFCOMM channel number is included in the service name of the other legacy application, thereby differentiating the service names.

Thus, in accordance with the present embodiment of the present invention, the virtual serial port driver performs the additional function of automatically providing a service name for a legacy application. By introducing this function to the virtual serial port driver, the present invention implements a standard and efficient approach for providing the service name for a legacy application, so that the legacy application is readily identifiable to the user. As such, the present invention simplifies for the user the service discovery process for legacy applications.

Figure 9:
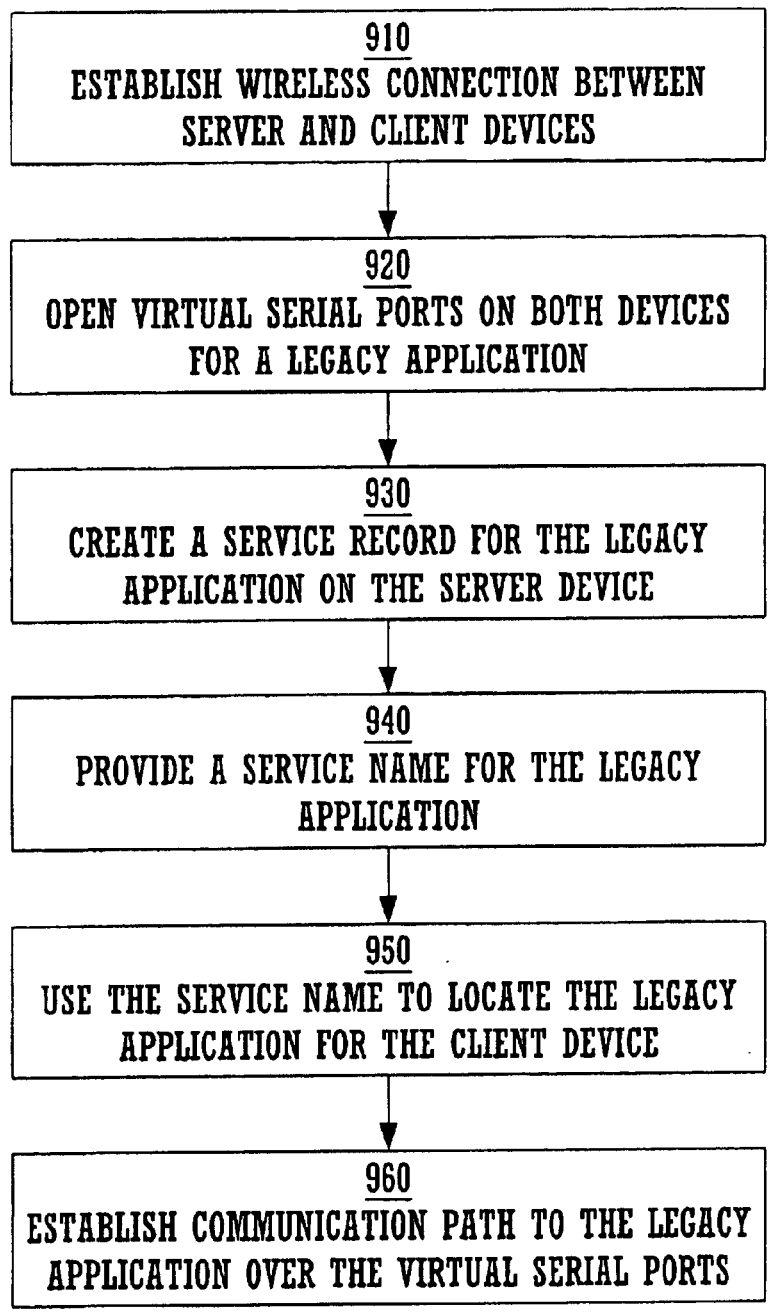
FIG. 9 is a flowchart of the steps in a process for accessing a legacy application in accordance with one embodiment of the present invention.

FIG. 9 is a flowchart of the steps in a process 900 for accessing a legacy application (e.g., legacy application 710a of FIG. 7) in accordance with one embodiment of the present invention. Process 900 is implemented by a first wireless transceiver device such as device A 702 (FIG. 7) and a second wireless transceiver device such as device B 704 (FIG. 7). In the present embodiment, process 900 is implemented as computer-readable program instructions stored in a memory unit (e.g., ROM non-volatile 430 of FIG. 4) and executed by a processor (e.g., processor 450 or DSP 422 of FIG. 4).

In step 910 of FIG. 9, a persistent wireless connection is established between devices A 702 and B 704 of FIG. 7. For the purposes of the discussion herein, device A 702 is treated as a server device and device B 704 is treated as a client device.

In step 920 of FIG. 9, with reference as well to FIG. 7, a virtual serial port (e.g., one of the virtual serial ports 730a) is opened for legacy application 710a. In the present embodiment, the virtual serial port is opened by a virtual serial port driver residing on device A 702. Similarly, a virtual serial port (e.g., one of the virtual serial ports 730b) is opened on device B 704 by a serial port driver residing on that device. Thus, once the service discovery process is completed in accordance with the present invention, a non-legacy application residing on device B 704 can communicate with legacy application 710a via the virtual serial port 730a. In a similar manner, once the service discovery process is completed in accordance with the present invention, legacy application 710b can communicate with legacy application 710a via virtual serial ports 730a and 730b.

In step 930 of FIG. 9, and with reference to FIG. 7, a service record is created on device A 702 for legacy application 710a. In one embodiment, the service record is created when the virtual serial port 730a is opened for legacy application 710a. In another embodiment, the service record is created when legacy application 710a is executed (step 910). It is appreciated that a service record can also be created on device B 704 for legacy application 710b.

In step 940 of FIG. 9, with reference also to FIG. 7, in the present embodiment of the present invention, the virtual serial port driver for device A 702 performs the added function of providing the service name for legacy application 710a that is entered into the service record created in step 930. In one embodiment, the service name is derived by the virtual serial port driver from the name of the legacy application 710a. In another embodiment, the service name is a default name. In one embodiment, the service name includes the RFCOMM channel number for the virtual serial port associated with legacy application 710*a*. In these and other embodiments, the service name provided by the virtual serial port driver is a name that a user recognizes as corresponding to legacy application 710*a*.

In step 950 of FIG. 9, and with reference to FIG. 7, the service name for legacy application 710*a* is used to locate that application for device B 704. For example, the service name can be displayed to a user who is using device B 704 to browse through the services and applications provided by device A 702 in accordance with the Bluetooth Service Discovery Protocol, in order to find the recognizable (human-readable) service name for legacy application 710*a*.

In step 960 of FIG. 9, with reference also to FIG. 7, once legacy application 710*a* is located by its service name, a communication path (data link) can be established to that application from device B 704 (e.g., from legacy application 710*b*) over virtual serial ports 730*a* and 730*b*. In this manner, device B 704 can utilize or interact with legacy application 710*a* running on device A 702, or legacy application 710*b* (or some other application on device B 704) can interact with legacy application 710*a*.

In summary, the present invention provides a device and method for automatically providing service record information (in particular, the service name) for legacy applications resident on Bluetooth-enabled devices. The present invention also provides a device and method that is user-friendly and conveniently implemented. In addition, the present invention provides a device and method that can be implemented in Bluetooth-enabled devices and that is consistent with the Bluetooth specification.

The preferred embodiment of the present invention, efficient service registration for legacy applications in a Bluetooth environment, is thus described. While the present invention has been described in particular embodiments, it should be appreciated that the present invention should not be construed as limited by such embodiments, but rather construed according to the following claims.

What is claimed is:

1. In a network of wireless devices comprising a first wireless transceiver device and a second wireless transceiver device, a method for accessing a legacy application residing on said first wireless transceiver device, said method comprising the steps of:

a) establishing a wireless connection between said first wireless transceiver device and said second wireless transceiver device;

b) opening a first virtual serial port on said first wireless transceiver device and a second virtual serial port on said second wireless transceiver device, wherein said first and second virtual serial ports are opened by a first virtual serial port driver and a second virtual serial port driver respectively and wherein said first and second virtual serial ports are for emulating a serial connector for said legacy application;

c) creating on said first wireless transceiver device a service record corresponding to said legacy application;

d) registering in said service record a service name for said legacy application, wherein said service name is provided by said first virtual serial port driver;

e) using said service record to locate said legacy application for said second wireless transceiver device; and f) establishing a communication path from said second wireless transceiver device to said legacy application using said first and second virtual serial ports.

2. The method as recited in claim 1 wherein said first and second wireless transceiver devices are a Bluetooth-enabled device.

3. The method as recited in claim 2 wherein said service record is a Service Discovery Protocol service record.

4. The method as recited in claim 2 wherein said first and second virtual serial port drivers are substantially compliant with the RFCOMM protocol and comprise a port emulation entity.

5. The method as recited in claim 4 wherein said step b) comprises the step of:

b1) selecting a RFCOMM channel number for said first virtual serial port.

6. The method as recited in claim 5 wherein said step d) comprises the step of:

including said RFCOMM channel number in said service name.

7. The method as recited in claim 1 wherein said step d) comprises the step of:

deriving said service name from a name for said legacy application.

8. The method as recited in claim 1 wherein said step d) comprises the step of:

using a default name for said service name.

\* \* \* \* \*